(12) United States Patent
Chiaki

(10) Patent No.: US 9,225,958 B2
(45) Date of Patent: Dec. 29, 2015

(54) VIDEO SIGNAL PROCESSOR AND METHOD OF PROCESSING VIDEO SIGNAL

(71) Applicant: Panasonic Corporation, Osaka (JP)

(72) Inventor: Hisako Chiaki, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 515 days.

(21) Appl. No.: 13/668,394

(22) Filed: Nov. 5, 2012

(65) Prior Publication Data

US 2013/0242045 A1    Sep. 19, 2013

(30) Foreign Application Priority Data

Mar. 15, 2012  (JP) ................................. 2012-058288
Jul. 6, 2012   (JP) ................................. 2012-152734

(51) Int. Cl.
   *H04N 13/00* (2006.01)
(52) U.S. Cl.
   CPC ........... *H04N 13/00* (2013.01); *H04N 13/0025* (2013.01)
(58) Field of Classification Search
   None
   See application file for complete search history.

(56) References Cited

U.S. PATENT DOCUMENTS

| 5,003,385 | A | 3/1991 | Sudo |
| 5,142,642 | A | 8/1992 | Sudo |
| 6,177,952 | B1 * | 1/2001 | Tabata et al. ................... 348/47 |
| 2009/0256950 | A1 | 10/2009 | Kawazoe et al. |
| 2012/0229608 | A1 | 9/2012 | Sawachi |
| 2013/0128072 | A1 * | 5/2013 | Kobayashi ................. 348/222.1 |

FOREIGN PATENT DOCUMENTS

| JP | 2-058493 A | 1/1990 |
| JP | 6-269025 A | 9/1994 |
| JP | 08-251626 A | 9/1996 |
| JP | 2006-157432 A | 6/2006 |
| JP | 2012-019399 A | 1/2012 |
| WO | WO 2010/095074 A1 | 8/2010 |

* cited by examiner

*Primary Examiner* — Kate Luo
(74) *Attorney, Agent, or Firm* — Renner, Otto, Boisselle & Sklar, LLP (57) ABSTRACT

In a video signal processor, a difference value calculation section calculates a difference value between video signals at two or more different points of view, which have been input to a video signal input section, at each predetermined timing. A compensation value calculation section holds the difference value between the video signals, which have been obtained at the predetermined timing, at each predetermined time interval. The compensation value calculation section calculates a compensation value with reduced compensation variations along a time axis using the held difference value. A video signal compensation section compensates the video signals using the obtained compensation value. Furthermore, the compensation value calculation section also calculates the compensation value with reduced compensation variations along the time axis based on information at imaging, which has been obtained by an information input section at each predetermined timing.

16 Claims, 7 Drawing Sheets

VIDEO SIGNAL PROCESSOR AND METHOD OF PROCESSING VIDEO SIGNAL

CROSS-REFERENCE TO RELATED APPLICATION

This application claims priority to Japanese Patent Application No. 2012-058288 filed on Mar. 15, 2012 and Japanese Patent Application No. 2012-152734 filed on Jul. 6, 2012, the disclosure of which including the specification, the drawings, and the claims is hereby incorporated by reference in its entirety.

BACKGROUND

The present disclosure relates to video signal processors processing video signals for stereoscopic viewing.

Today, display devices displaying stereoscopic images (3D images) and imaging devices imaging the stereoscopic images have drawn attention. Various displaying methods have been suggested. All of them are based on the fundamental principle of feeling stereoscopic images from binocular disparity between right and left images.

Stereoscopic viewing is performed utilizing disparity, which is a difference between images. However, if a difference other than the disparity, for example, vertical disparity, disparity of the angle of view, or color disparity occurs between images, stereoscopic viewing is badly influenced.

As a conventional method of compensating such disparity, Japanese Patent Publication No. H02-58493 teaches integrating brightness or color tones in the horizontal direction and performing correlation comparison between images, thereby compensating vertical disparity.

SUMMARY

In the conventional technique, however, the most suitable compensation is performed for images obtained at each predetermined timing. In viewing a stereoscopic video image as a moving picture, a compensation value, which is calculated for one or more of numbers of images forming the moving picture, may be significantly different from compensation values of the other images. At this time, the compensation values vary in the moving picture as a whole, thereby causing problems such as a flicker in the moving picture.

It is an objective of the present disclosure to solve the problem. The present disclosure more effectively reduces flickers in a moving picture in a video signal processor processing video signals for stereoscopic viewing.

Therefore, the present disclosure obtains difference values (amounts of disparity) between video signals at each predetermined timing, holds the difference values, and calculates compensation values with reduced compensation variations along the time axis based on a series of the obtained difference values.

Specifically, a video signal processor according to the present disclosure includes a video signal input section configured to receive video signals at two or more different points of view; a difference value calculation section configured to calculate a difference value between the video signals at the two or more points of view, which have been obtained at each predetermined timing; a compensation value calculation section configured to hold the difference value which has been obtained by the difference value calculation section at each predetermined time interval, and to calculate a compensation value with reduced compensation variations along a time axis using the held difference value; and a video signal compensation section configured to compensate a difference between the video signals using the compensation value, which has been obtained by the compensation value calculation section, and to output the video signals whose difference has been compensated.

As described above, the present disclosure uses a series of difference values held at predetermined time intervals. For example, where one of the difference values is greater than the other difference values, the compensation value calculation section does not use the compensation value corresponding to the great difference value. The compensation value calculation section uses a compensation value corresponding to the other difference values to reduce compensation variations along the time axis among the series of difference values, thereby providing comfortable stereoscopic viewing.

As described above, the video signal processor and the method of processing video signals according to the present disclosure reduce processing variations due to a change in the direction along the time axis and the parameter, thereby providing comfortable stereoscopic viewing.

DETAILED DESCRIPTION

Embodiment is described in detail below with reference to the attached drawings. However, unnecessarily detailed description may be omitted. For example, detailed description of well known techniques or description of the substantially same devices may be omitted. Such omission is intended to prevent the following description from being unnecessarily redundant and to help those skilled in the art easily understand it.

Inventor provides the following description and the attached drawings to enable those skilled in the art to fully understand the present disclosure. Thus, the description and the drawings are not intended to limit the scope of the subject matter defined in the claims.

EMBODIMENT

Figure 6:
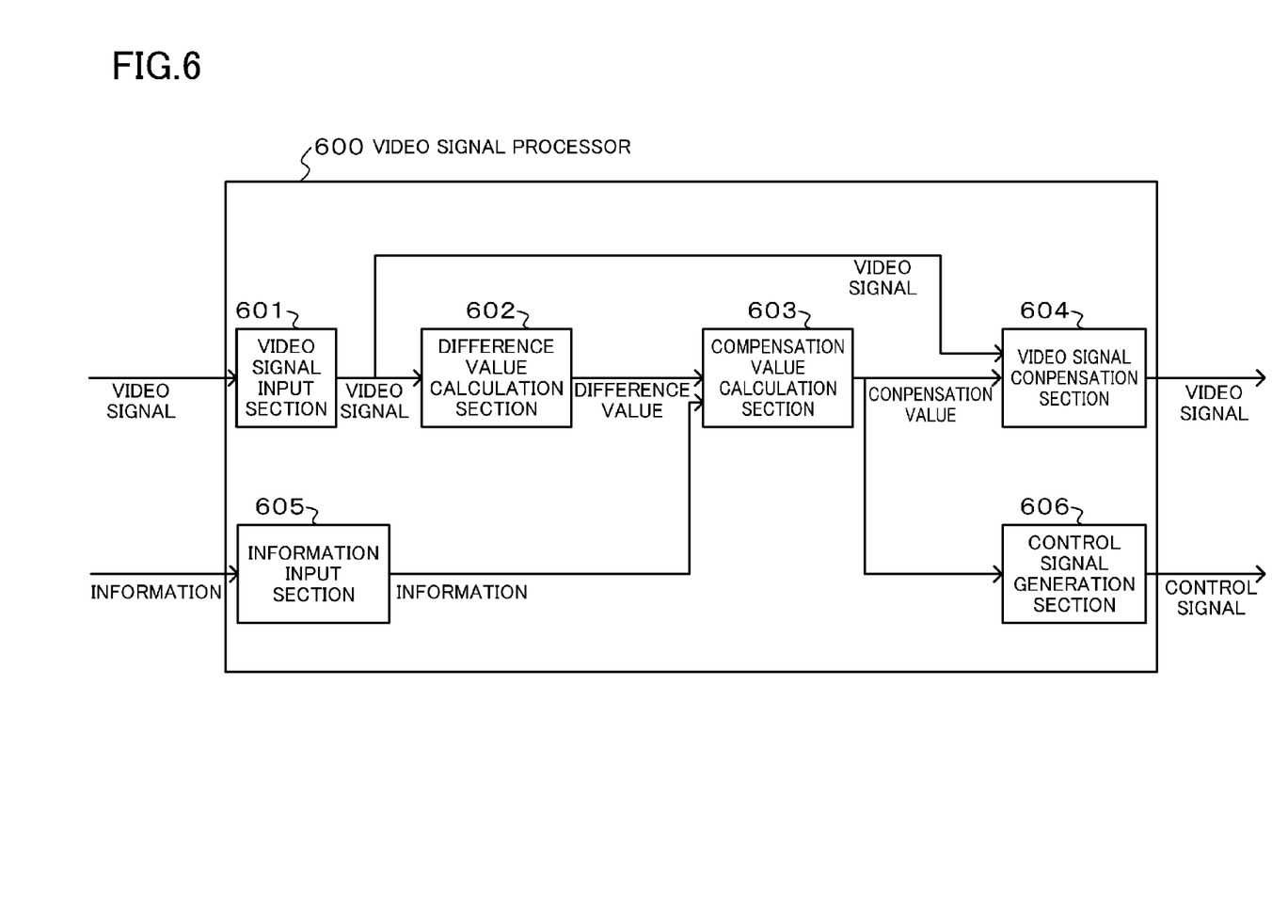
FIG. 6 is a block diagram illustrating a combination of the video signal processors of FIGS. 4 and 5.

FIG. 6 is a block diagram illustrating an example configuration of a video signal processor according to this embodiment.

A video signal processor 600 includes a video signal input section 601, a difference value calculation section 602, a compensation value calculation section 603, a video signal compensation section 604, an information input section 605, and a control signal generation section 606.

The video signal input section 601 receives video signals at two or more different points of view, and outputs the video signals to the difference value calculation section 602 and the video signal compensation section 604. The video signal input section 601 outputs the signals to a difference value calculation section 202 in FIG. 2, and to a difference value calculation section 502 in FIG. 5. The video signal at the two or more different points of view are, for example, right- and left-eye images used in stereoscopic viewing.

The difference value calculation section 602 calculates a difference value between the right- and left-eye images obtained at each predetermined timing, and outputs the difference value to the compensation value calculation section 603. The predetermined timing is, for example, every frame. The difference value between the right- and left-eye images is, for example, the amount of vertical disparity. The amount of disparity of the right-eye image from the left-eye image is expressed by a line number or a pixel number, where the downward direction of the image is a positive direction and the upward direction is a negative direction. The amount of disparity can be obtained, for example, by correlation comparison between integration of the brightness or the color tones in the horizontal direction in the right- and left-eye images. Alternatively, for example, the amount of vertical disparity may be obtained by a positional change amount by searching in the right-eye image, a region similar to a predetermined region in the left-eye image.

Figure 4:
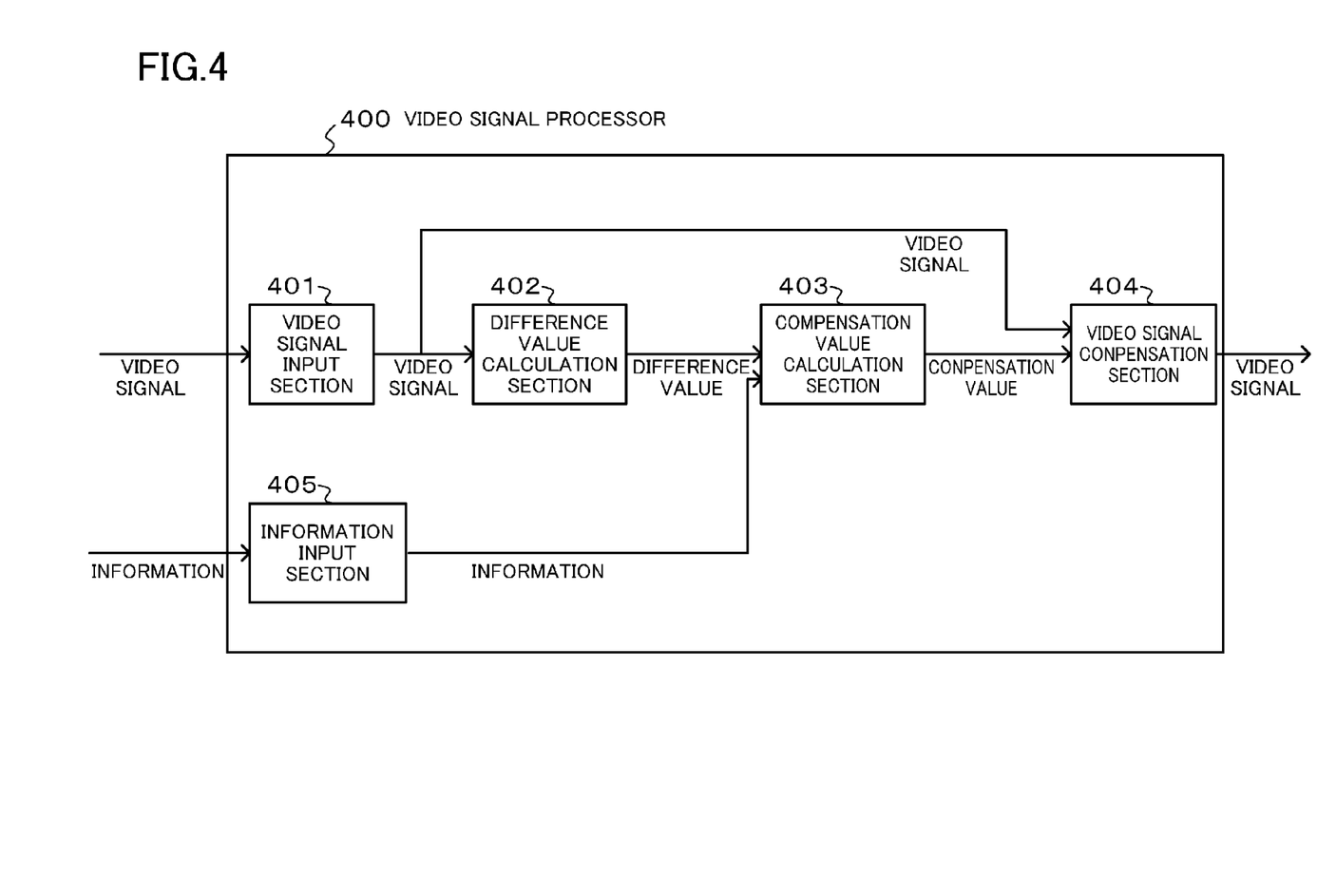
FIG. 4 is a block diagram illustrating a variation of the video signal processor of FIG. 1.
Figure 5:
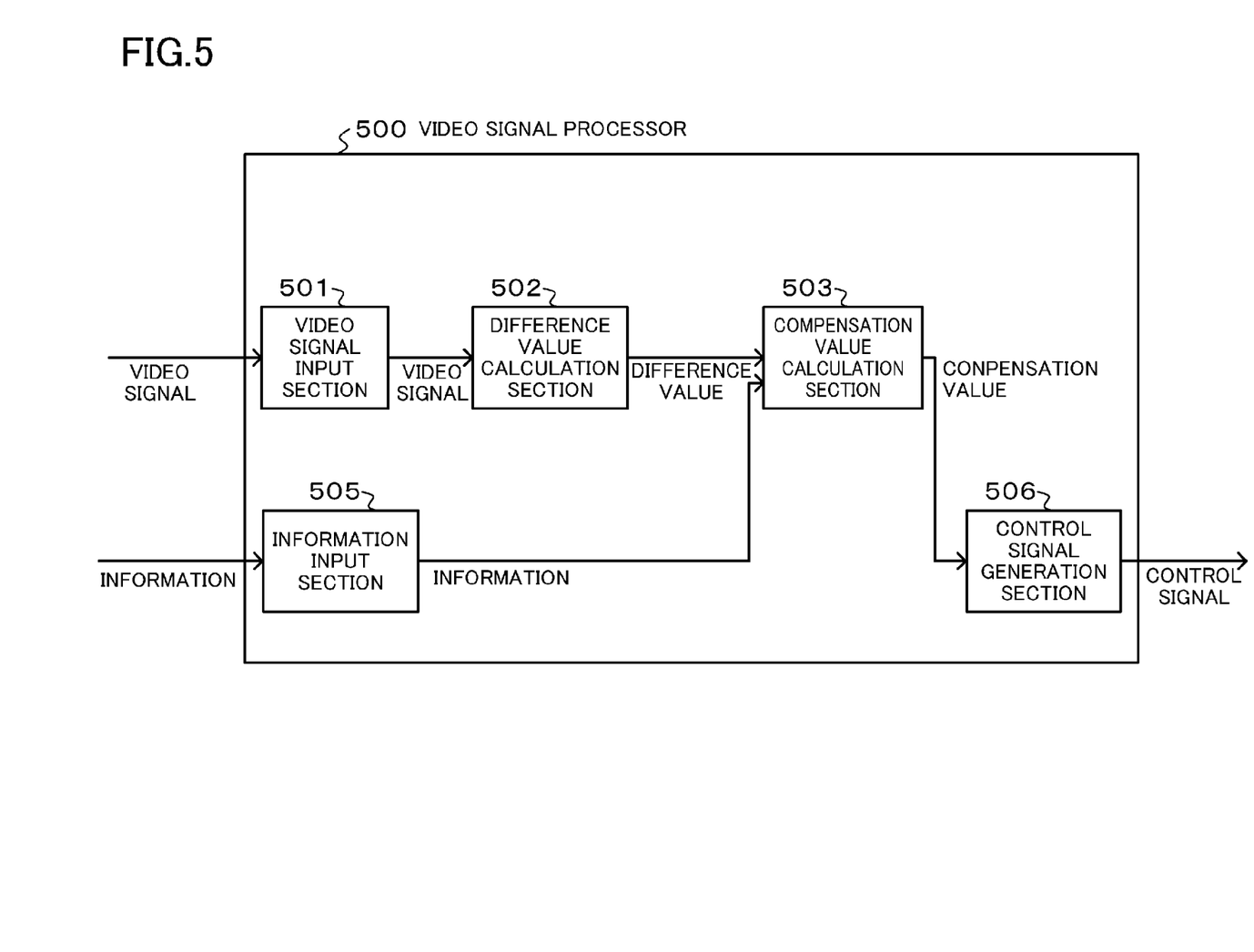
FIG. 5 is a block diagram illustrates another variation of the video signal processor.

In FIG. 6, the video signal processor 600 includes the information input section 605, which receives information at imaging, and outputs the information at the imaging, which has been obtained at each predetermined timing, to the compensation value calculation section 603. The configurations in FIGS. 4 and 5 are similar. As the information at the imaging, a single value is obtained for a single information item where for example, an imaging device for the left-eye image and an imaging device for the right-eye image are integrated or controlled at the same time. The item of the information at the imaging is, for example, a zooming value. The predetermined timing is, for example, every frame, which is the same as the timing of the difference value calculation section 602.

The compensation value calculation section 603 calculates a compensation value for compensating the video signals. In compensation of vertical disparity, the difference between the right- and left-eye images can be compensated by shifting the right-eye image by the amount of the disparity. Thus, for example, the negative value of the amount of disparity is the compensation value. The compensation value calculation section 603 holds the amount of vertical disparity between the right- and left-eye images, which have been obtained at the predetermined timing, at each predetermined time interval. For example, the compensation value calculation section 603 holds the amount of disparity on every frame, which is the same as the predetermined timing. Assume that the amounts of vertical disparity for five frames are to be held, and the amounts of the disparity on the first, second, fourth, and fifth frame are five lines, and only the amount of the disparity on the third frame is ten lines. If the images on the frames are compensated using compensation values reflecting the amounts of disparity without change, the moving picture seems flickering. In order to reduce this problem, the proper amount of disparity is calculated from the previous and subsequent frames of the frame to be compensated. In this embodiment, the compensation value is calculated using the mode (i.e., the most frequent value) of the amounts of disparity at past several times. That is, the amount of disparity on the third frame is also considered as five lines. As such, where a certain frame has a different amount of disparity, the subject appears in the left-eye image but not in the right-eye image at the frame-in of the subject. Since the right-eye image does not have a region corresponding to the region in the left-eye image including the subject, erroneous detection may occur in searching the region. While the mode is used as an example of the compensation value, the compensation value may be the median (the middle value), an average, or other calculation results.

Figure 7:
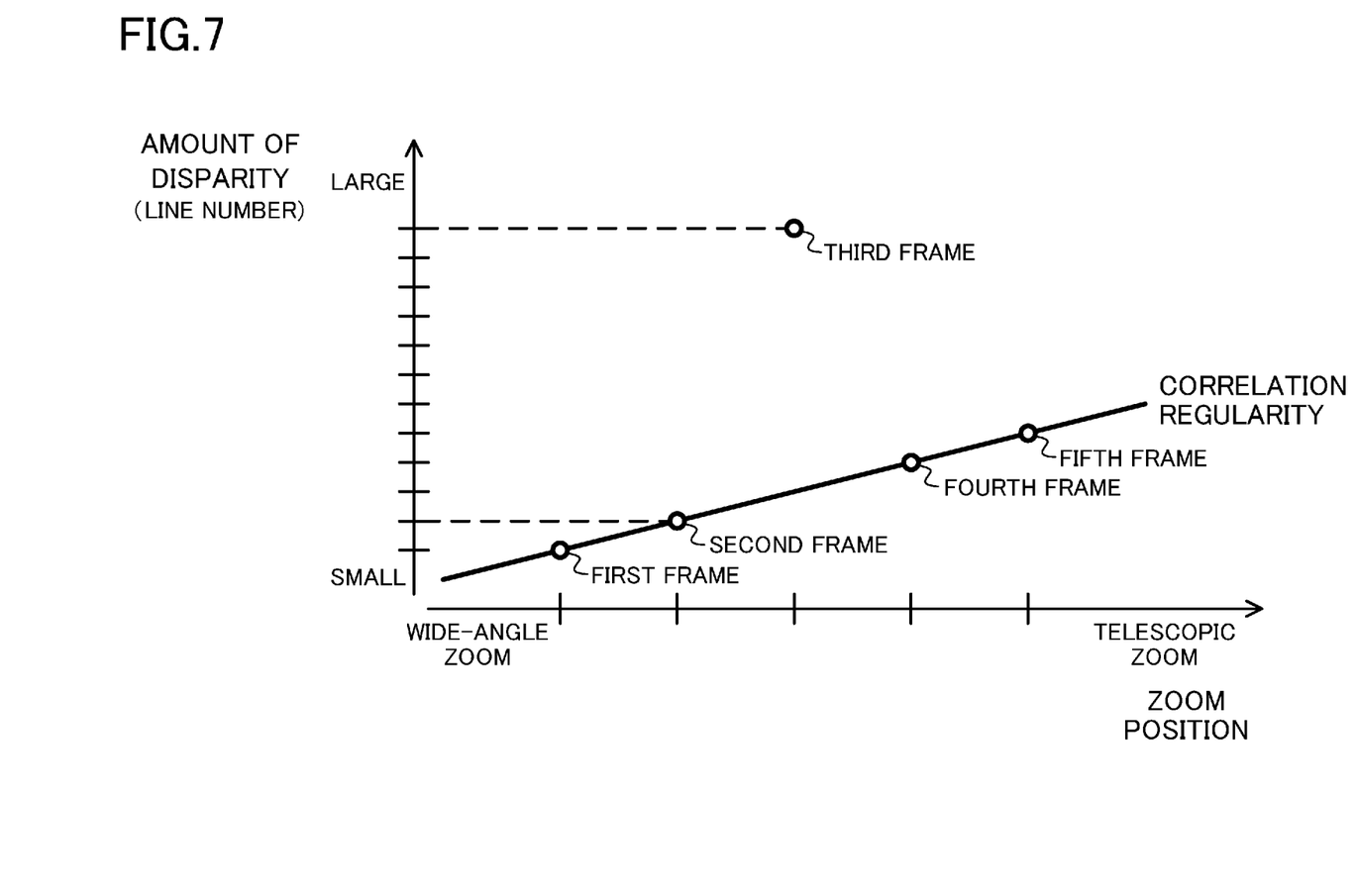
FIG. 7 illustrates an example method of calculating a compensation value by a compensation value calculation section included in the video signal processor according to the embodiment.

In FIGS. 4, 5, and 6, information on a zooming value is held for every frame together with the amount of disparity. A change in the zooming value relates to a change in the amount of vertical disparity. A sensor of an optical unit of an imaging apparatus has an error in bonding accuracy, thereby causing disparity between the center of the optical axis and the center of an imaging area. With a change in the zooming value, the center of the picture moves. The errors in the bonding accuracy differ from optical unit to optical unit. Even if imaging apparatuses for right and left eyes have the same zooming value, vertical disparity between the images occurs due to the disparity of the centers of the right- and left-eye images in different directions and in different sizes. Thus, with a change in the zooming value, the amount of vertical disparity also changes. Therefore, the compensation value, which is the mode of the held amounts of disparity for several frames is not necessarily proper. When the zooming value changes, the compensation value is calculated using the amount of disparity for the corresponding frame. Alternatively, where a change in the zooming value and the amount of vertical disparity have regularity such as linearity, the rule is held in advance, and a proper compensation amount may be calculated for an amount of disparity, which is out of the rule. For example, as shown in FIG. 7, the zooming value and the amount of vertical disparity have correlation regularity of changing linearly, and a change in the zooming value from the first frame to the fifth frame is constant. In this case, where the amounts of vertical disparity, the disparity for one line on the first, second, and fifth frames of five frames to be held are one line more than the respective previous frames, and only the amount of vertical disparity on the third frame is ten lines more, the compensation value is calculated as if the amount of disparity on the third frame is also one line more than the pervious frame. Accordingly, the amount of disparity on the fourth frame is also one line more than the third frame.

The video signal compensation section 604 performs compensation using the obtained compensation value. For example, as in the description of the compensation value calculation section 603, a difference between the right- and left-eye images is compensated by shifting the right-eye image by the compensation value.

Figure 3:
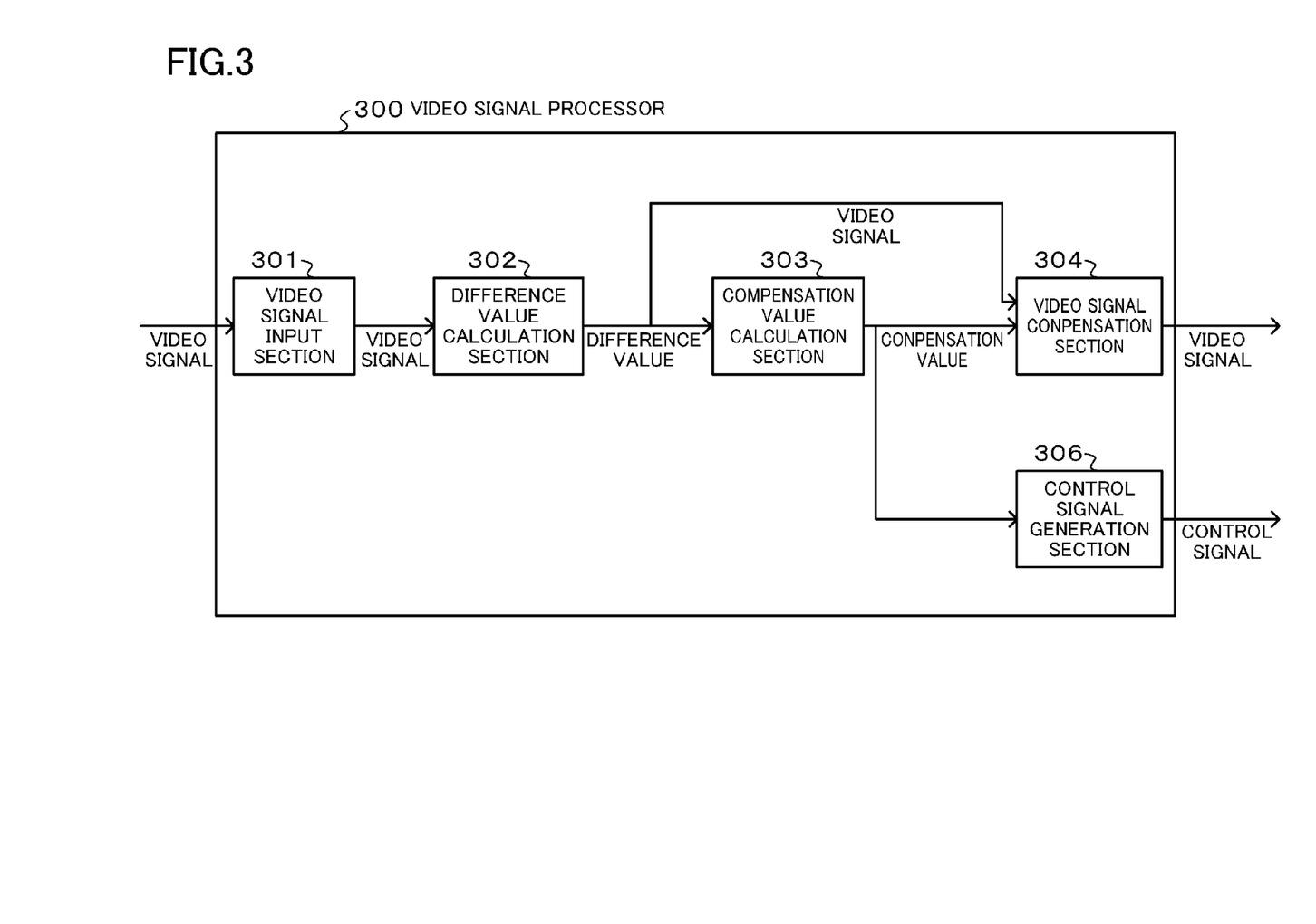
FIG. 3 is a block diagram illustrating a combination of the video signal processors of FIGS. 1 and 2.

In FIG. 6, the control signal generation section 606 is included, which generates a control signal from the obtained compensation value. For example, the control signal generation section 606 generates a control signal for not the compensation made by shifting the obtained video signal of the right-eye image, but for the compensation made by shifting the read-out line of a sensor of an imaging device in obtaining the right-eye image. For example, where the compensation value is too great to compensate the amount of disparity, the control signal generation section 606 generates an alert signal to notify the problem using an imaging device etc. The configurations in FIGS. 3 and 5 are similar. In FIGS. 3 and 6, the video signals and the control signal are output. Depending on the contents of the control signal, either one or both of the signals may be used. In particular, the compensation of the difference between the obtained video signals is suitable for instantaneous erroneous compensation. The compensation using a control signal of the imaging device is suitable for the case where the images have a constant difference value such as color disparity.

The example configurations of the video signal processor according to this embodiment have been described above using the block diagrams.

This video signal processor reduces problems caused by compensation variations In viewing a stereoscopic video image as a moving picture.

An example has been described where the video signal input section 601 receives the right- and left-eye images used for stereoscopic viewing as the video signals obtained at the two or more different points of view. Instead, the video signals may be compound-eye images obtained by arranging imaging devices in a matrix etc.

An example has been described where the predetermined timing of the difference value calculation section 602 and the information input section 605 is the same, i.e., every frame. Instead, the predetermined timing may be extremely close. The extremely close timing may be used, for example, where a video image is obtained from an imaging device, which alternately records right- and left-eye images for stereoscopic viewing every 1/60 second, and the obtained images slightly deviate from each other, for example, by 1/60 second. The timing may be every any number of frames, fields, or seconds. The timing may be externally given, or each of the difference value calculation section 602 and the information input section 605 may include a clock, a counter, etc.

While an example has been described where the difference value calculation section 602 and the information input section 605 hold the difference values for five frames at predetermined time intervals, they may hold the difference values for any number of frames, fields, or seconds. Alternatively, some of held difference values may be used.

Where an example has been described where the difference value calculation section 602 uses the amount of vertical disparity, the difference to be calculated may be a difference in the horizontal direction, in the angle of view, in rotation, in brightness, or color. As a difference in the horizontal direction, for example, the amount of horizontal disparity between imaging devices arranged in the vertical direction is calculated in compound-eye images obtained by arranging imaging devices in a matrix etc. Similar to the amount of vertical disparity, the amount of horizontal disparity can be obtained, for example, from a positional change amount by searching in the right-eye image, a region similar to a predetermined region in the left-eye image. As the difference in the angle of view, for example, the amount of disparity in the angle of view is calculated, where right- and left-eye images for stereoscopic viewing have the same set value but have different actual angles of view due to individual differences of the respective imaging devices. As the amount of disparity in the angle of view, the enlargement ratio and the reduction ratio in an increase in similarity can be obtained by, for example, enlarging or reducing a region in the right-eye image similar to a predetermined region in the left-eye image. As the difference in rotation, for example, the amount of disparity in rotation is calculated, where rotation disparity occurs between the right- and left-eye images due to low adjustment accuracy between the imaging devices etc. Similar to the amount of disparity in the angle of view, as the amount of disparity in rotation, the rotation angle in an increase in similarity can be obtained, for example, by rotating a region in the right-eye image similar to a predetermined region in the left-eye image. As the difference in the brightness, for example, the amount of the difference in the brightness is calculated, where the difference in the brightness occurs between the right- and left-eye images due to low adjustment accuracy between the imaging devices etc. The amount of the difference in the brightness can be obtained by, for example, subtracting the average of the brightness of the right-eye image from the average of the brightness of the left-eye image. Similar to the difference in the brightness, the color difference can be obtained, for example, for each RGB component.

In the compensation value calculation section 603, the negative value of the amount of vertical disparity is the compensation value. An offset value may be added to the compensation value, or may be used at a certain ratio. The compensation value may be obtained by using the difference value in a calculation formula. While the difference value is held at each predetermined time interval, the compensation value may be held at each predetermined time interval.

While in the information input section 605, an example has been described where the information at the imaging is the zooming value, the information may be an iris value, a focus value, and other imaging information influencing the video image. Alternatively, a combination of the information may be used. The iris value may be used, for example, for compensating a difference in the brightness between images. The focus value may be used, for example, for extracting edges of images to adjust the degrees of blur. The combination of the information may be used, for compensating vertical disparity caused by fluctuations in the optical axes of lenses.

As the information input to the information input section 605, a single value is obtained for a single information item where for example, an imaging device for the right-eye image and an imaging device for the left-eye image are integrated or controlled at the same time. However, values may be independently obtained from a plurality of imaging devices for a single information item. Where information is obtained from a plurality of imaging devices, information on a difference between the imaging devices may be used in the compensation value calculation section 603.

While in the control signal generation section 606, an example has been described where vertical disparity is compensated by shifting the read-out line of the sensor of the imaging device in obtaining the right-eye image, what is to be controlled may be different depending on what is to be compensated. For example, where disparity occurs in the angles of view, the lens of the imaging device is controlled to change the zoom position.

In the above description, an example has been described where compensation is made to conform the right-eye image to the left-eye image. Instead, compensation may be made to conform the left-eye image to the right-eye image, and both of the right- and left-eye images may be compensated. This compensation is also applicable to compound-eye images.

Figure 1:
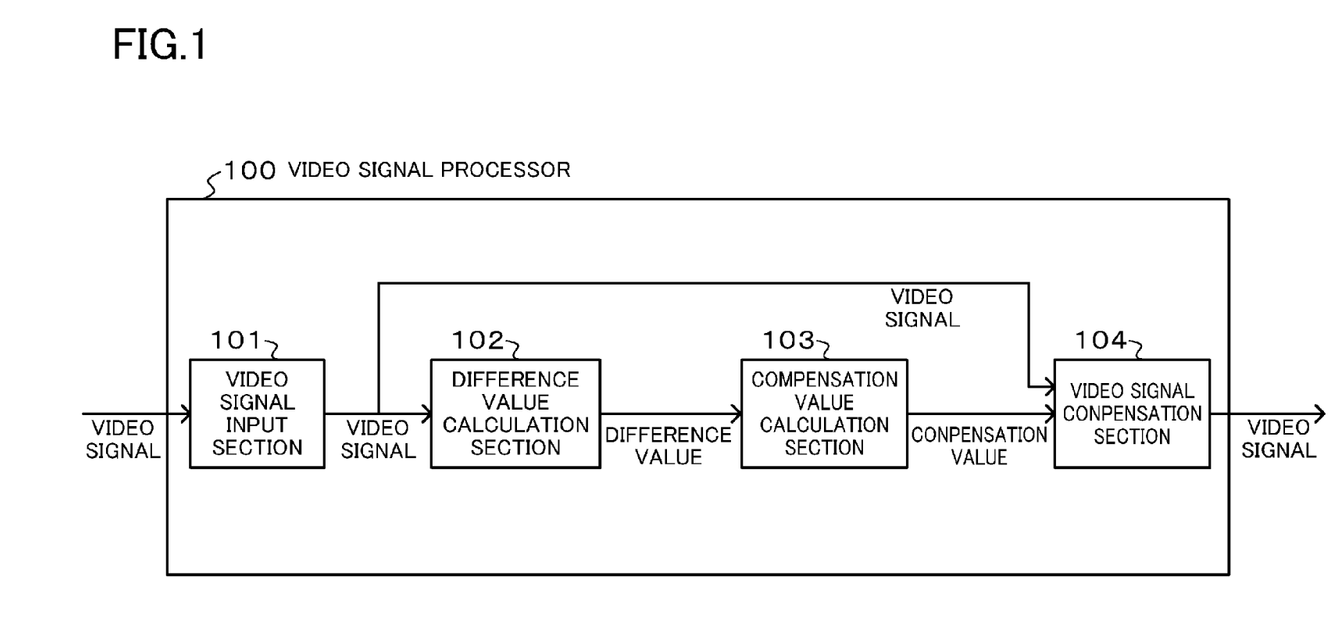
FIG. 1 is a block diagram illustrating an example of a video signal processor according to an embodiment.
Figure 2:
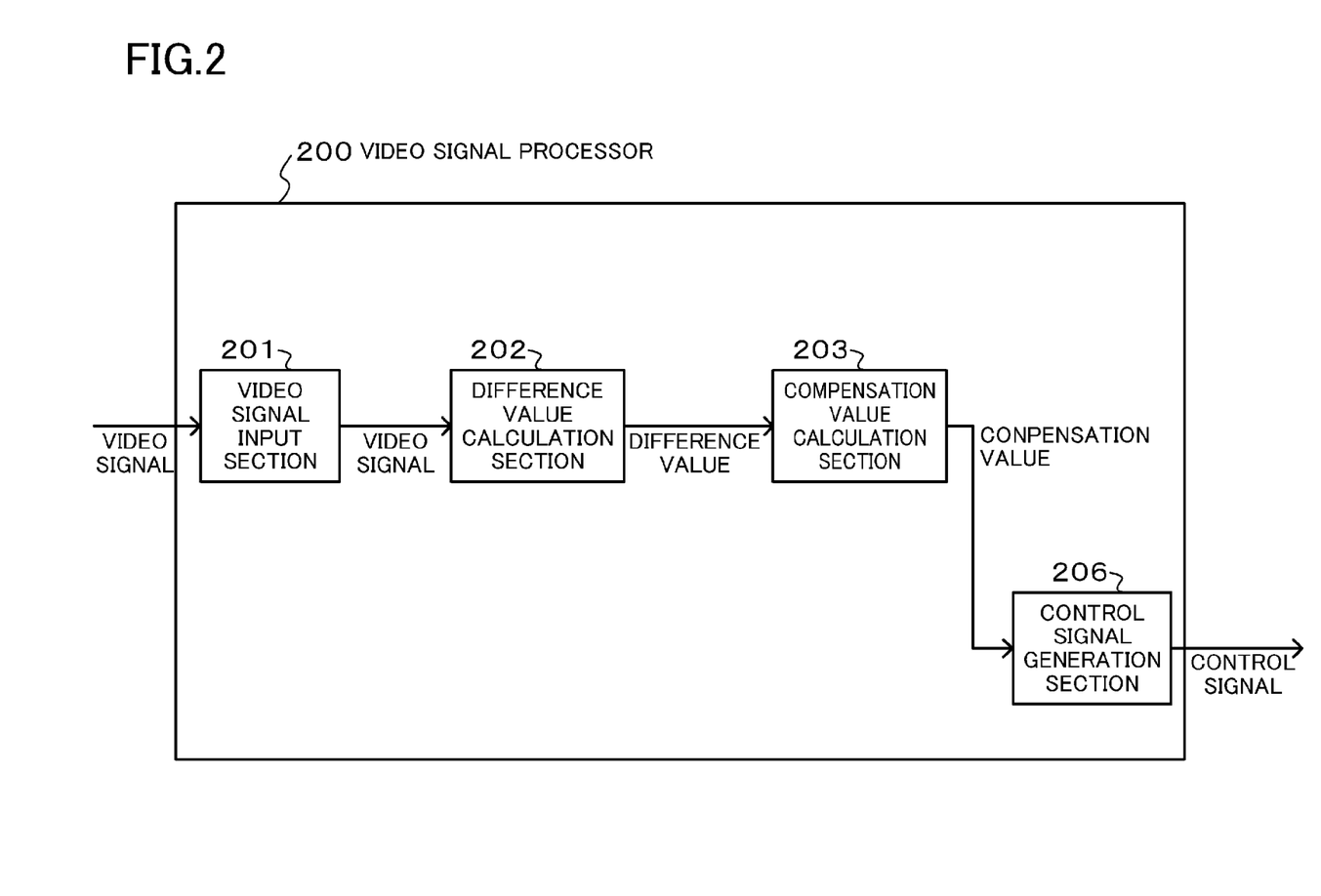
FIG. 2 is a block diagram illustrating another example of the video signal processor.

While the configuration of FIG. 6 has been mainly described, the present disclosure is not limited thereto. In FIG. 6, in place of the video signal compensation section 604 and the control signal generation section 606, only the video signal compensation sections 104 and 404, or only the control signal generation sections 206 and 506 may be included as shown in FIGS. 1, 2, 4, and 5. Alternatively, as shown in FIGS. 1-3, the information input section 605 of FIG. 6 may not be included.

As described above, the embodiment has been described as example techniques disclosed in the present application. However, the techniques according to the present disclosure are not limited to these embodiments, but are also applicable to those where modifications, substitutions, additions, and omissions are made.

In particular, as an example, with use of programmable microcomputers as the difference value calculation section 602, the compensation value calculation section 603, the video signal compensation section 604, and the control signal generation section 606, what is to be processed can be changed by changing the program. This improves the flexibility in designing these devices. These devices may be implemented by hardware logics. Using hardware logics is advantageous in increasing processing speed. The devices may be formed by a single element or physically formed by a plurality of elements. In using a plurality of elements, operations recited in the claims may be implemented by individual elements. In this case, the plurality of devices can form each of the difference value calculation section 602, the compensation value calculation section 603, the video signal compensation section 604, and the control signal generation section 606. Alternatively, two or more of the devices may be formed by a single element. In short, these devices may be physically in any form, as long as they can exhibit their functions.

Various embodiments have been described above as example techniques of the present disclosure, in which the attached drawings and the detailed description are provided.

As such, devices illustrated in the attached drawings or the detailed description may include not only essential devices for solving the problem, but also non-essential devices for solving the problem in order to illustrate such techniques. Thus, the mere fact that those non-essential devices are shown in the attached drawings or the detailed description should not be interpreted as requiring that such devices be essential.

Since the embodiment described above is intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

As described above, the video signal processor according to the present disclosure reduces problems caused by compensation variations in viewing a stereoscopic video image as a moving picture, and is thus useful for 3D video cameras for capturing a stereoscopic video image, or a 3D editor.

What is claimed is:

1. A video signal processor comprising:
a video signal input section configured to receive video signals at two or more different points of view;
a difference value calculation section configured to calculate a difference value between the video signals at the two or more points of view, which have been obtained at each predetermined timing;
a compensation value calculation section configured to hold a plurality of difference values, which have been obtained by the difference value calculation section, at predetermined time intervals, and calculate a compensation value using the difference values to reduce compensation variations along a time axis among the plurality of difference values;
a video signal compensation section configured to compensate a difference between the video signals using the compensation value, which has been obtained by the compensation value calculation section, and to output the video signals whose difference has been compensated;
a control signal generation section configured to generate a control signal using the compensation value which has been obtained by the compensation value calculation section and to output the control signal; and
an information input section configured to receive information at imaging, wherein the compensation value calculation section holds the difference value, which has been obtained by the difference value calculation section, and the information at the imaging, which has been obtained by the information input section at each predetermined timing, at each predetermined time interval, and calculates the compensation value with reduced compensation variations along the time axis based on the information at the imaging using the held difference value.

2. The video signal processor of claim 1, further comprising an information input section configured to receive information at imaging, wherein the compensation value calculation section holds the difference value, which has been obtained by the difference value calculation section, and the information at the imaging, which has been obtained by the information input section at each predetermined timing, at each predetermined time interval, and calculates the compensation value with reduced compensation variations along the time axis based on the information at the imaging using the held difference value.

3. The video signal processor of claim 1, wherein the video signals, which are input to the video signal input section, are video signals at points of right- and left-eye view.

4. The video signal processor of claim 1, wherein the information at the imaging to be input to the information input section is at least one piece of information on zoom, iris, or focus.

5. The video signal processor of claim 1, wherein the compensation value calculation section calculates the compensation value corresponding to an amount of change in the information at the imaging, which has been input to the information input section, to compensate the difference value held at each predetermined time interval.

6. A video signal processor comprising:
a video signal input section configured to receive video signals at two or more different points of view;
a difference value calculation section configured to calculate a difference value between the video signals at the two or more points of view, which have been obtained at each predetermined timing;
a compensation value calculation section configured to hold the difference value which has been obtained by the difference value calculation section at each predetermined time interval, and to calculate a compensation value with reduced compensation variations along a time axis using the held difference value; and
a control signal generation section configured to generate a control signal using the compensation value which has been obtained by the compensation value calculation section and to output the control signal.

7. The video signal processor of claim 6, further comprising:
an information input section configured to receive information at imaging, wherein the compensation value calculation section holds the difference value, which has been obtained by the difference value calculation section, and the information at the imaging, which has been obtained by the information input section at each predetermined timing, at each predetermined time interval, and calculates the compensation value with reduced compensation variations along the time axis based on the information at the imaging using the held difference value.

8. A video signal processor comprising:
a video signal input section configured to receive video signals at two or more different points of view;

a difference value calculation section configured to calculate a difference value between the video signals at the two or more points of view, which have been obtained at each predetermined timing;

a compensation value calculation section configured to hold a plurality of difference values, which have been obtained by the difference value calculation section, at predetermined time intervals, and calculate a compensation value using the difference values to reduce compensation variations along a time axis among the plurality of difference values; and a video signal compensation section configured to compensate a difference between the video signals using the compensation value, which has been obtained by the compensation value calculation section, and to output the video signals whose difference has been compensated, wherein the difference value calculation section calculates a difference in an angle of view.

9. A video signal processor comprising:

a video signal input section configured to receive video signals at two or more different points of view;

a difference value calculation section configured to calculate a difference value between the video signals at the two or more points of view, which have been obtained at each predetermined timing;

a compensation value calculation section configured to hold a plurality of difference values, which have been obtained by the difference value calculation section, predetermined time intervals, and calculate a compensation value using the difference values to reduce compensation variations along a time axis among the plurality of difference values; and a video signal compensation section configured to compensate a difference between the video signals using the compensation value, which has been obtained by the compensation value calculation section, and to output the video signals whose difference has been compensated; and a control signal generation section configured to generate a control signal using the compensation value which has been obtained by the compensation value calculation section and to output the control signal, wherein the control signal output from the control signal generation section is a control signal influencing at least one of zoom or iris.

10. A method of processing video signals, the method comprising:

inputting the video signals at two or more different points of view;

calculating a difference value between the video signals at the two or more points of view, which have been obtained at each predetermined timing;

calculating a compensation value with reduced compensation variations along a time axis using the difference value, which has been obtained in the calculating the difference value and held at each predetermined time interval; and compensating a difference between the video signals using the compensation value, which has been obtained in the calculating the compensation value, and outputting the video signals whose difference has been compensated.

11. The method of claim 10, further comprising generating a control signal using the compensation value which has been obtained in the calculating the compensation value, and outputting the control signal.

12. The method of claim 11, further comprising inputting information at imaging, wherein in the calculating the compensation value, the difference value, which has been obtained in the calculating the difference value, and the information at the imaging, which has been obtained in the inputting the information at each predetermined timing, are held at predetermined time intervals, and the compensation value with reduced compensation variations along the time axis is calculated based on the information at the imaging using the held difference value.

13. The method of claim 10, further comprising inputting information at imaging, wherein in the calculating the compensation value, the difference value, which has been obtained in the calculating the difference value, and the information at the imaging, which has been obtained in the inputting the information at each predetermined timing, are held at predetermined time intervals, and the compensation value with reduced compensation variations along the time axis is calculated based on the information at the imaging using the held difference value.

14. A method of processing video signals, the method comprising:

inputting the video signals at two or more different points of view;

calculating a difference value between the video signals at the two or more points of view, which have been obtained at each predetermined timing;

calculating a compensation value with reduced compensation variations along a time axis using the difference value, which has been obtained in the calculating the difference value and held at each predetermined time interval; and generating a control signal using the compensation value which has been obtained in the calculating the compensation value, and outputting the control signal.

15. The method of claim 14, comprising inputting information at imaging, wherein in the calculating the compensation value, the difference value, which has been obtained in the calculating the difference value, and the information at the imaging, which has been obtained in the inputting the information at each predetermined timing, are held at predetermined time intervals, and the compensation value with reduced compensation variations along the time axis is calculated based on the information at the imaging using the held difference value.

16. A video signal processor comprising:

a video signal input section configured to receive video signals at two or more different points of view, wherein the video signals at the two or more different points of view comprise a sequence of frames;

a difference value calculation section configured to calculate with the sequence of frames a difference value between the corresponding two or more points of view of each frame, which have been obtained at each predetermined timing;

a compensation value calculation section configured:
to hold the difference value between the two or more points of view of each frame at each predetermined time interval, such that the compensation value calculation section holds multiple difference values, and
to calculate an average of the held difference values as a compensation value with reduced compensation variations along a time axis; and a video signal compensation section configured to compensate a difference between the video signals using the compensation value, which has been obtained by the compensation value calculation section, and to output the video signals whose difference has been compensated.

* * * * *